3,829,448
PROCESS FOR PRODUCING γ-LACTONES AND
CYCLIC ETHERS
Junichi Kanetaka, Takashi Shimodaira, and Shoichiro Mori, Ami, Japan, assignors to Mitsubishi Petrochemical Company Limited, Tokyo-to, Japan
No Drawing. Filed June 11, 1971, Ser. No. 152,455
Claims priority, application Japan, June 18, 1970, 45/52,394; July 17, 1970, 45/62,680
Int. Cl. C07d 5/06
U.S. Cl. 260—343.6
4 Claims

ABSTRACT OF THE DISCLOSURE

A nickel-base hydrogenation catalyst comprises nickel and an additive metal in a state of intimately close combination, the additive metal being germanium or a metal of Group I-A or II-A of the Periodic Table. This catalyst is effective when used in the catalytic hydrogenation of a dicarboxylic anhydride or a partially hydrogenated product thereof thereby to produce a corresponding cyclic lactone or cyclic ether.

BACKGROUND OF THE INVENTION

This invention relates generally to hydrogenation and catalysts therefor. More particularly, the invention relates to a new and advanced nickel-base catalyst suitable for use in a process wherein carboxylic acid or a compound containing a carbonyl group which may produce carboxylic acid as a by-product is subjected to catalytic hydrogenation thereby to transform the pertinent carbonyl group into a methylene group.

It is known that, in general, nickel is used as a hydrogenation catalyst. Furthermore, the use of a nickel-base catalyst also in the hydrogenation of maleic anhydride, which is one example of the above mentioned specific hydrogenation reaction is known, as disclosed in the specifications of United States Pat. Nos. 2,772,291, 2,772,292, and 2,772,293, and Japanese Patent Publication No. 4461/1964, for example.

However, in a system wherein water and a lower organic acid such as butyric acid or propionic acid are produced as the principal product or a by-product or the organic acid exists from the beginning in the system, as in the case of catalytic hydrogenation of dicarboxylic anhydrides and cyclic lactones, the nickel constituent of the catalyst is subject to permanent poisoning and, in extreme cases, begins to dissolve out in the reaction liquor as a nickel salt. For this reason, a nickel-base catalyst of the type ordinarily used is accompanied by the difficulty of great lowering of the catalytic activity during use.

Heretofore, in the production of ordinary nickel catalysts, salts of metals of Group I-A of the Periodic Table, e.g., sodium carbonate, have been used as precipitants, but the precautionary procedure of carefully washing with water the nickel salt cake formed to remove alkaline substances thoroughly has been considered to be necessary. The reason for this has been that any remaining alkaline substance tends to lower, in general, the hydrogenation activity of the nickel.

We have found, on the contrary, that in the hydrogenation of a dicarboxylic anhydride, the addition of an alkali metal or an alkaline earth metal suppresses the phenomenon of dissolving out of the nickel metal in an organic acid, and the nickel is activated. This is an original discovery of ours.

SUMMARY OF THE INVENTION

It is an object of this invention to utilize the above stated discovery and other findings we have made to overcome the afore-described difficulties in providing a new and highly effective hydrogenation catalyst and processes for using the same.

According to this invention in one aspect thereof, briefly summarized, there are provided nickel-base hydrogenation catalysts each formed by the intimately close combination of a metal of Group I-A or II-A of the Periodic Table or germanium and nickel.

According to this invention in another aspect thereof, there is provided a process for producing products of hydrogenation which comprises subjecting a dicarboxylic acid anhydride or a partially hydrogenated product thereof to catalytic hydrogenation thereby to produce a corresponding cyclic lactone or cyclic ether, and which is characterised in that the catalytic hydrogenation is carried out with the use of a nickel base catalyst comprising, in intimately close combination, nickel and a metal selected from metals of Groups I-A and II-A of the Periodic Table and germanium.

Thus, while the catalyst according to this invention is a nickel-base catalyst modified by the above mentioned specific metal (hereinafter referred to as an "additive metal"), we have found that this catalyst has a remarkably improved acid-resistant characteristic in addition to its catalytic characteristic in hydrogenation, which is intrinsically possessed by nickel catalysts.

Accordingly, the catalyst according to this invention is highly effective for use not only in cases, such as that of hydrogenation of a dicarboxylic anhydride, where free carboxylic acid is produced as a by-product but also in the hydrogenation of free carboxylic acid itself for production of alcohols.

Further features of this invention will be apparent from the following detailed description beginning with a consideration of general features and characteristics of the invention and concluding with specific examples of practice illustrating preferred embodiments of the invention.

DETAILED DESCRIPTION

Preparation of the Catalyst

While it is possible to prepare the catalysts of this invention by various processes including the presence or absence of a carrier and the mode of introducing the carrier, it is preferable, in general, to prepare a catalyst in a state wherein it is carried by a carrier by the following process.

A nickel compound to decompose into metal nickel and the metal compound specified above to decompose into the metal or a lower oxide are uniformly and intimately merged on a carrier by heating these compounds in a reducing atmosphere.

This process can be carried out by any of various modes of practice and is not limited in respect to the mode. For example, one possible process is that wherein a nickel compound in the form of a soluble salt and an additive metal compound are caused to merge on a carrier by impregnation from an aqueous solution of the compounds.

Another possible process comprises dropping a precipitant into an aqueous solution of a nickel compound in which a carrier has been dispersed thereby to cause the nickel ingredient to deposit on the carrier, drying the resulting nickel salt with carrier, and impregnating the dried salt with an additive metal compound in the state of an aqueous solution. In still another process, an additive metal compound soluble in a precipitant is used, and a suitable quantity of the additive metal is caused to remain in the resulting nickel salt cake. A further process comprises kneading an additive metal compound in the state of an aqueous solution uniformly into a nickel salt cake formed from a nickel compound by the use of a precipitant and causing the resulting mixture to be deposited on a carrier.

Of these processes, the last process appears to be particularly suitable and can be carried out by the following specific procedure. A solution (particularly an aqueous solution) of a nickel compound is prepared, and a precipitant for rendering this nickel compound insoluble is dropped, in the state of an aqueous solution, into the nickel compound solution to cause the nickel ingredient to precipitate.

The nickel compound is preferably soluble in water and readily decomposable by heat. Specific examples of suitable nickel compounds are salts such as nickel nitrate, nickel sulfate, nickel chloride, nickel acetate, and nickel formate. Specific examples of suitable precipitants are ammonia water, urea, ammonium carbonate, and ammonium bicarbonate.

The nickel ingredient thus formed is filtered out and washed with water thereby to produce a nickel cake. The washing with water in this procedure is carried out with ample thoroughness to remove matter, such as sulfate radicals and sodium ions, which would otherwise cause a lowering of the catalyst activity.

The nickel cake thus washed is thoroughly kneaded with a solution of an additive metal compound which can assume the form of a solution (particularly an aqueous solution). A carrier is then admixed with the mixture thus kneaded. In general, a porous carrier is preferable. While silica-alumina is frequently used, it is also possible to use substances such as diatomaceous earth (silicious marl), silica gel, and alumina, which can be used as catalyst carriers. Then, as the resulting mixture is dehydrated, the nickel ingredient and the additive metal ingredient are caused in a kneaded state to disperse uniformly on the carrier.

The mass thus obtained is dried for approximately 24 hours at a suitable temperature, for example, a temperature of the order of from 80 to 120 degrees C. More specifically, this temperature should be from 80 to 100 degrees C. in the case of a compound of a Group IA or Group IIA metal and from 110 to 120 degrees C. in the case of a germanium compound.

The powder thus obtained is heated in a stream of hydrogen gas at a suitable temperature, for example, a temperature of the order of from 200 to 400 degrees C. to decompose the nickel compound and the additive metal compound. More specifically, this heating is carried out at a temperature of from 300 to 400 degrees C. in the case of a compound of a Group IA or Group IIA metal and from 200 to 300 degrees C. in the case of a germanium compound.

After this decomposition, the temperature is raised to a value of the order of from 350 to 550 degrees C., preferably of the order of from 400 to 450 degrees C., and the resulting powder is subjected to hydrogen reduction at this elevated temperature for a period of the order of from 3 to 6 hours, whereupon a catalyst according to the invention is obtained.

When necessary, it is also possible to add a suitable binder to the process materials during any of the steps in the above described production process and to form the catalyst into any desired shape.

While a water-soluble compound is desirable for use as the compound of the additive metal used in the above described preparation of the catalyst, it is possible to produce a catalyst of considerably high activity also by adding a compound in the form of a fine powder of low solubility. Furthermore, in the case where the compound of the additive metal is a chloride, the activity of the catalyst produced is generally low. Examples of usable additive metal compounds are:

$LiNO_3$, $Li_2CO$, $NiOH$, $NaNO_3$, $Na_2CO_3$, $NaOH$, $KNO_3$, $K_2CO_3$, $KOH$, $RbNO_3$, $Rb_2CO_3$, $RbOH$, $CsNO_3$, $CsCO_3$, $CsOH$, $Be(NO_3)_2$, $Mg(NO_3)_2$, $Ca(NO_3)_2$, $Sr(NO_3)_2$, $Ba(NO_3)_2$.

A catalyst produced in the above described manner has the characteristic of igniting when it contacts air, similarly as in the case of a reduced nickel catalyst. However, it is possible to render this catalyst into a convenient catalyst which will not ignite upon contacting air by a process for stabilizing an ordinary nickel catalyst for treatment with a gas such as air diluted with carbon dioxide or an inert gas. We have found that a catalyst thus stabilized can be rendered highly effective by subjecting it to a preparatory reduction in a hydrogen atmosphere at a temperature of from 150 to 200° C. at the time of use in a hydrogenation reaction.

In a nickel-base catalyst prepared in the above described manner according to this invention, the additive metal and the nickel are in a mutually intimate or close state, and particularly in the case where the additive metal is germanium, it can be assumed that all or a part thereof is in the form of a solid solution with the nickel. Accordingly, terms such as "intimately combined" or "closely merged" as herein used designate a state which is substantially the same as the state of close proximity of the nickel and additive metal which is actually attained in the preparation described above.

Provided that a catalyst according to this invention is one which can be called a nickel-base catalyst and contains an additive metal, the additive metal content need not be held with any limits. We have found, however, that in an ordinary hydrogenation reaction, a catalyst in which the atomic ratio of the nickel to the Group IA or Group IIA metal is in the range of from 3:1 to 300:1, preferably from 10:1 to 150:1 is excellent. The use of a catalyst of a ratio by weight of the nickel to the carrier of from 0.1:1 to 3:1 generally produces good results.

Among the Group IA and Group IIA metals, barium appears to exhibit the best activity. We have found further that a suitable content of germanium is such that the atomic ratio of germanium/nickel is less than 1.0, an atomic ratio in the range of 0.02 to 0.8 producing particularly good results. Furthermore, when a carrier is used, a ratio by weight of nickel/carrier in the range of from 0.1 to 2.0 is suitable.

Use of the Catalyst

A catalyst prepared in the above described manner has been found to be a nickel-base catalyst having improved acid resistance, as mentioned hereinbefore.

Accordingly, this catalyst can be used with maximum advantage in the production of alcohols by hydrogenating the carbonyl radical of monocarboxylic acid or a polycarboxylic acid. The carboxylic acid may be one having a group which is inactive in an ordinary hydrogenation reaction as, for example, a hydroxyl group, an amino group, or a halogen, or it may be one having a group capable of undergoing hydrogenation as, for example, a carbon-carbon unsaturated bond, a nitro group, a nitrile group, or a carbonyl group.

Specific examples of carboxylic acids of this character are saturated fatty acids such as acetic acid, propionic acid, butyric acid, valeric acid (valerianic acid), stearic acid, and palmitic acid; dicarboxylic acids such as malonic acid, succinic acid, glutaric acid, and adipic acid; unsaturated carboxylic acids such as oleic acid, maleic acid, and fumari acid; aromatic carboxylic acids such as benzoic acid, phthalic acid, trimellitic acid, and pyromellitic acid; hydroxy-carboxylic acids such as hydroxybutyric acid, caproic acid, tartaric acid, and malic acid; amino acids such as glutamic acid and lysine; keto acids such as acetoacetic acid; and mixtures of these acids.

These carboxylic acids may be in the form of functional derivatives thereof such as, for example, intramolecular or intermolecular anhydrides, salts, esters, and amides. Of these derivatives, anhydrides and esters, especially intramolecular esters of hydroxy acids or cyclic lactones, are particularly important.

As dicarboxylic acid anhydrides, anhydrides of aliphatic dibasic acids, particularly maleic acid anhydride, succinic acid anhydride, and glutaric acid anhydride are most representative, while α- and/or β-substituted products thereof, e.g., lower alkyl substitution products, can also be used. For stability of the cyclic structure, this cyclic dicarboxylic acid anhydride is preferably of a five-membered or six-membered ring structure.

An example of a partially hydrogenated product of a cyclic dicarboxylic acid anhydride of this character is a compound resulting from the hydrogenation of one carbonyl group into a methylene group, that is, a cyclic lactone.

The products of the hydrogenation are a cyclic lactone and (or) a cyclic ether from a cyclic dicarboxylic anhydride and a cyclic ether from a partially hydrogenate product of a cyclic dicarboxylic anhydride, e.g., cyclic lactone. More specifically, the production process of hydrogenating maleic anhydride or succinic anhydride to form γ-butyrolactone and hydrogenating this product to form tetrahydrofuran is a typical mode of use of the catalyst according to this invention.

The catalyst according to this invention, furthermore, can be used also in the hydrogenation of bonds or groups, such as a carbon-carbon unsaturated bond, a nitro group, a nitrile group, and a carbonyl group, which can be hydrogenated through the use of an ordinary nickel catalyst.

The process for hydrogenating substances to be hydrogenated of this character can be carried out under any of the conditions and by any of the means for a reaction of this kind wherein a nickel-base catalyst is used. For example, the reaction of hydrogenating carboxyl acids through the use of this novel catalyst can be carried out ordinarily at a reaction temperature of from 100 to 300° C.

This hydrogenation is preferably carried out under elevated hydrogen pressure. We have found that, in general, a pressure of from 30 to 700 atmospheres is suitable. Furthermore, while the general practice is to cause the starting materials to react independently at a reaction temperature above their melting points, it is also possible when necessary to cause reaction by using a suitable solvent or by dilution with a reaction intermediate.

In order to indicate still more fully the nature and utility of this invention, the following specific examples of practice constituting preferred embodiments of the invention and results are set forth, it being understood that these examples are presented as illustrative only and that they are not intended to limit the scope of the invention.

Example 1

A catalyst was prepared in the following manner. An aqueous solution was prepared by dissolving 300 grams (g.) of nickel nitrate $(Ni(NO_3)_2 \cdot 6H_2O)$ in 240 g. of distilled water. Into this solution, another aqueous solution of 240 g. of ammonium bicarbonate $(NH_4HCO_3)$ in 1,200 g. of distilled water was dropped as the resulting mixture was agitated, whereupon precipitation of basic nickel carbonate of yellowish green color occurred. The precipitate thus obtained was filtered, and the resulting cake was washed with distilled water, whereupon a basic nickel carbonate cake was obtained. The nickel content of this cake was found to 12.2 percent by weight.

To eight lots, each of 24.6 g., of this cake, 0 g., 0.16 g., 0.32 g., 0.64 g., 0.96 g., 1.33 g., 1.60 g., and 2.67 g. of germanium dioxide in the state of an aqueous solution were respectively added for the preparation of Catalysts 1 through 8, respectively. Each mixture thus formed was thoroughly kneaded, and then 3 g. of powdered silica-alumina (alumina content 13 percent by weight) was added thereto. The pasty material thus obtained for each catalyst was heated to approximately 80° C. and then kneaded and dried and was then dried for 12 hours at a temperature of from 110 to 120° C.

Each of the powders thus obtained was reduced for 3 hours in a stream of hydrogen gas at 450° C. Each catalyst thus reduced with hydrogen was cooled to 150° C., and then the hydrogen stream was changed to a stream of carbon dioxide, in which the catalyst was left overnight. After this carbon dioxide treatment, air diluted with nitrogen was caused to contact the catalyst gradually. The catalyst layer gives off heat in this case, but the temperature was prevented from exceeding 50° C.

The weight ratio of the nickel and silica-alumina in each of the catalysts prepared in this manner was 1:1, and the atomic ratios of the germanium and nickel of the catalysts were as set forth in Table 1.

By using 3 g. of each of the Catalysts 1 through 8, 40 g. of succinic anhydride was caused to react in contact with hydrogen for 3 hours under a reaction pressure of 120 kg./cm.$^2$ and at a reaction temperature of 260° C. in a 100-cc. autoclave of the electromagnetic agitation type, which was operated at an agitation speed of 1,000 r.p.m. during the reaction.

Upon completion of each reaction, the reaction product and the catalyst were separated, and the reaction product was subjected to gas chromatographic analysis by the internal standard method, whereupon the results as indicated in Table 1 were obtained.

The group of substances herein referred to as "others" in the composition of the reaction product comprises succinic acid as the predominant constituent and minute quantities of substances such as alcohols, monobasic acids, and esters thereof.

TABLE 1

| Catalyst: | Ge/Ni, atomic ratio | Reaction product composition (mole percent) | | |
|---|---|---|---|---|
| | | Tetra-hydro-furan | γ-Butyro-lactone | Others |
| 1 | 0.0 | 0.3 | 51.2 | 48.5 |
| 2 | 0.3 | 3.2 | 59.9 | 36.9 |
| 3 | 0.06 | 8.0 | 74.6 | 17.4 |
| 4 | 0.12 | 14.0 | 72.0 | 14.0 |
| 5 | 0.15 | 17.0 | 70.2 | 12.8 |
| 6 | 0.25 | 22.7 | 66.5 | 10.8 |
| 7 | 0.30 | 22.6 | 64.1 | 13.3 |
| 8 | 0.50 | 5.2 | 64.9 | 29.9 |

Example 2

To each of four lots, each of 24.6 g., of the nickel cake obtained in Example 1, 0.64 g. of germanium dioxide together with some water was added, and the resulting mixture was thoroughly kneaded. To the four lots of mixtures thus kneaded, 6 g., 3 g., 2 g., and 1.5 g. of powdered silica-alumina were respectively added, and the resulting mixtures were thoroughly kneaded. Thereafter, the procedure set forth in Example 1 was carried out with respect to these four mixtures.

As a result, catalysts each having an atomic ratio of germanium to nickel of 0.12 and having the weight ratios of nickel to silica-alumina as set forth in Table 2 were obtained.

By using these four catalysts and succinic anhydride as a starting material, reactions were carried out under the same reaction conditions as specified in Example 1, whereupon reaction products of the compositions set forth in Table 2 were obtained.

TABLE 2

| Catalyst: | Ni/(silica-alumina), weight ratio | Reaction product composition (mole percent) | | |
|---|---|---|---|---|
| | | Tetra-hydro-furan | γ-Butyro-lactone | Others |
| 9 | 0.5 | 8.1 | 66.5 | 25.4 |
| 4 | 1.0 | 14.0 | 72.0 | 14.0 |
| 10 | 1.5 | 16.1 | 70.3 | 13.6 |
| 11 | 2.0 | 12.3 | 71.0 | 16.7 |

Example 3

With the use of 3 g. of Catalyst 4 (atomic ratio GeNi=0.12, weight ratio Ni/(silica-alumina)=1.0) of Example 1, 40 g. of maleic anhydride was subjected to catalytic hydrogenation in the same autoclave as that specified in Example 1. The reaction conditions were a reaction pressure of 100 kg./cm.$^2$, a reaction temperature of 150° C., and reaction time of one hour. The catalytic hydrogenation was then continued for a further 3 hours at a reaction pressure of 120 kg./cm.$^2$ and a reaction temperature of 260° C.

As a result, an objective product containing 13.7 mole percent of tetrahydrofuran and 72.4 mole percent of γ-butyrolactone was produced.

Example 4

A mixture formed by diluting 20 g. of succinic anhydride with 20 g. of γ-butyrolactone and 3 g. of Catalyst 4 of Example 1 were introduced into an autoclave and subjected to catalytic hydrogenation under the conditions set forth in Example 1.

As a result, an objective product containing 27.5 mole percent of tetrahydrofuran and 61.0 mole percent of γ-butylrolactone was produced.

Example 5

On the basis of the preparation process set forth in Example 1, 1.33 g. of germanium dioxide was added to 24.6 g. of a nickel cake of a nickel content of 12.2 percent by weight, and the resulting mixture was thoroughly kneaded. Instead of silica-alumina, 3 g. of diatomaceous earth was added a a carrier thereby to prepare a nickel-germanium-diatomaceous earth catalyst, in which the atomic ratio germanium/nickel was 0.25, and the weight ratio nickel/(diatomaceous earth) was 1.0.

With the use of this catalyst and succinic acid anhydride as a starting material, catalytic hydrogenation was carried out under the same conditions as those specified in Example 1.

As a result, an objective product containing 13.5 mole percent of tetrahydrofuran and 74.3 mole percent of γ-butyrolactone was produced.

Example 6

A basic nickel carbonate cake of yellowish green colour was prepared by precipitation from an aqueous solution of nickel nitrate with an aqueous solution of ammonium bicarbonate as a precipitant. To 7 lots of this cake, aqueous solutions of barium nitrate necessary for catalysts of the atomic ratios indicated in Table 3 were respectively added, and the resulting mixtures were thoroughly kneaded for the purpose of obtainnig uniform compositions, whereupon mixture cakes of nickel and barium in a pasty state were obtained.

To each of these cakes, silica-alumina of a particle size of from 60 to 80 mesh and of an alumina content of 13 percent by weight was added in a quantity such as to cause the weight ratio of the nickel to the silica-alumina to be 1:1. The resulting mixtures were thoroughly kneaded as they were warmed and were then heated to dryness.

Each of the resulting materials was dried for approximately 24 hours in a drier at 100° C., and after the resulting powder was decomposed in a stream of nitrogen gas at from 270 to 350° C., it was reduced for 3 hours in a stream of hydrogen gas at 450° C. After the solid thus reduced was cooled to 150° C., the hydrogen gas stream was replaced by a stream of carbon dioxide gas, in which the solid was left overnight. The solid material was then brought into gradual contact with air diluted with nitrogen and thereby stabilized. In this manner, Catalysts 2 through 18 of the composition shown in Table 3 were produced.

With the use of 3 g. each of Catalysts 12 through 18, 40 g. of respective lots of succinic anhydride were caused to react for 3 hours in contact with hydrogen in a 100-cc. autoclave of electromagnetic agitation type under a reaction pressure of 120 kg./cm.$^2$ and at a reaction temperature of 260° C. Upon completion of the reactions, gas chromatographic analysis of the products formed was carried out with of diethyl ketone as an internal standard substance.

The reaction liquor formed with Catalysts 1 (nickel only) exhibited a green color which is thought to be due to dissolving out of nickel metal, whereas the reaction liquors formed with Catalysts 13 through 18 were found to be colorless and transparent.

The results of the reactions are shown in Table 3. In this table, the term "others" designates unreacted succinic acid anhydride and hydrates thereof.

TABLE 3

| Catalyst | Ba/Ni, atomic ratio | Reaction product compostion (mole percent) | | | | | | |
|---|---|---|---|---|---|---|---|---|
| | | Tetra-hydro-furan | n-Pro-panol | n-Bu-tanol | Pro-pionic acid | Butyric acid | γ-Bu-tyro-lactone | Others |
| 12 | 0.0 | 0.3 | | | 3.0 | 4.5 | 47.4 | 44.9 |
| 13 | 0.01 | 14.1 | 0.1 | 0.3 | 1.5 | 0.4 | 61.2 | 22.4 |
| 14 | 0.02 | 17.9 | 0.3 | 0.5 | 1.8 | | 59.9 | 19.8 |
| 15 | 0.03 | 20.5 | Trace | 0.8 | 1.9 | 0.2 | 57.6 | 19.0 |
| 16 | 0.06 | 17.4 | Trace | 0.5 | 2.0 | Trace | 56.6 | 23.5 |
| 17 | 0.09 | 13.9 | Trace | 0.3 | 1.8 | Trace | 62.4 | 21.6 |
| 18 | 0.12 | 8.6 | Trace | 0.2 | 1.9 | 0.2 | 57.3 | 31.8 |

Example 7

The catalyst preparation process set forth in Example 6 was carried out with the use of eight metals of Group IA and Group IIA of the Periodic Table other than barium metal as additive metals in place of barium. These metals were lithium, sodium, potassium, rubidium, cesium, magnesium, calcium, and strontium. The atomic ratio of each of these metals to the nickel was 0.03.

The resulting Catalysts 19 through 26 were used in respective reactions carried out under the same conditions as those specified in Example 6, whereupon reaction products of the compositions indicated in Table 4 were obtained.

TABLE 4

| Catalyst | Additive metal | Reaction product composition (mole percent) | | | | | | |
|---|---|---|---|---|---|---|---|---|
| | | Tetra-hydro-furan | n-Pro-panol | n-Bu-tanol | Pro-pionic acid | Butyric acid | γ-Butyro-lactone | Others |
| 19 | Li | 5.4 | | 0.1 | 2.0 | 0.6 | 68.0 | 23.9 |
| 20 | Na | 6.5 | | Trace | 3.1 | 0.6 | 64.2 | 25.3 |
| 21 | K | 4.8 | | | 3.2 | 0.5 | 56.6 | 34.9 |
| 22 | Rb | 3.6 | Trace | Trace | 2.1 | 0.4 | 56.5 | 37.4 |
| 23 | Cs | 2.1 | | | 2.2 | 0.4 | 61.9 | 33.4 |
| 24 | Mg | 1.7 | | | 1.4 | 1.6 | 51.2 | 44.1 |
| 25 | Ca | 4.9 | | 0.1 | 1.7 | 1.0 | 58.9 | 33.4 |
| 26 | Sr | 2.9 | Trace | Trace | 2.1 | 0.8 | 58.2 | 36.0 |

Example 8

The catalyst preparation process set forth in Example 6 was carried out by adding barium carbonate in a quantity such as to obtain an atomic ratio of barium to nickel of 0.03:1, whereby a nickel-barium carbonate supported on silica-alumina catalyst was produced.

By using 3 g. of this catalyst, 40 g. of maleic anhydride was subjected to a hydrogenation reaction in the same reaction apparatus as that specified in Example 6 and under the reaction conditions of one hour of catalytic hydrogenation under a reaction pressure of 100 kg./cm.² and at a reaction temperature of 150° C. followed consecutively by three hours of catalytic hydrogenation under 120 kg./cm.² and at 260° C.

As a result, a reaction product containing 17.9 mole percent of tetrahydrofuran, 0.2 mole percent of n-propanol, 0.3 mole percent of n-butanol, 2.1 mole percent of propionic acid, 54.4 mole percent of γ-butyrolacetone and 24.7 mole percent of others was obtained.

What is claimed is:

1. A process for producing hydrogenated products selected from the group consisting of butyrolactone, tetrahydrofuran and mixtures thereof from starting materials selected from the group consisting of succinic anhydride, maleic anhydride which comprises the steps of contacting such starting materials in molten form at temperatures in the range 100–300° C. and at pressures in the range of 30–700 atmospheres, in the presence of hydrogen, with a catalytic material essentially consisting of nickel and an element selected from the group consisting of germanium and barium, the atomic ratio of said germanium to said nickel being 0.02:1 to 0.8:1, the atomic ratio of said nickel to said barium being in the range 3:1 to 300:1, for a time sufficient to hydrogenate said starting materials to substantial amounts of said final hydrogenated products and recovering said final products.

2. The process according to claim 1 wherein said catalytic material is distributed upon a support for catalytic materials.

3. The process according to claim 1 wherein said element is barium.

4. The process to claim 1 wherein said element is germanium.

References Cited

UNITED STATES PATENTS

| | | | |
|---|---|---|---|
| 2,772,291 | 11/1956 | McShane et al. | 260—343.6 |
| 2,772,292 | 11/1956 | McShane et al. | 260—343.6 |
| 3,021,343 | 2/1962 | Manly | 260—346.1 R |
| 3,492,314 | 1/1970 | Asano et al. | 260—343.6 |

ANNE MARIE T. TIGHE, Primary Examiner

U.S. Cl. X.R.

252—466 B, 466 PT; 260—346.1 R, 540, 617 R